United States Patent
Hood

(10) Patent No.: US 9,509,429 B2
(45) Date of Patent: Nov. 29, 2016

(54) ENERGY CONSERVATION BY MEANS OF TRAFFIC SHAPING

(71) Applicant: TELEFONAKTIEBOLAGET L M ERICSSON (PUBL), Stockholm (SE)

(72) Inventor: David Hood, Palo Alto, CA (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 603 days.

(21) Appl. No.: 13/787,596

(22) Filed: Mar. 6, 2013

(65) Prior Publication Data

US 2014/0255027 A1 Sep. 11, 2014

(51) Int. Cl.
*H04J 14/02* (2006.01)
*H04Q 11/00* (2006.01)

(52) U.S. Cl.
CPC ....... *H04J 14/0221* (2013.01); *H04Q 11/0067* (2013.01); *H04Q 2011/0086* (2013.01)

(58) Field of Classification Search
None
See application file for complete search history.

(56) References Cited

U.S. PATENT DOCUMENTS

| | | | | |
|---|---|---|---|---|
| 6,757,251 | B1* | 6/2004 | Nakaishi | 370/236.2 |
| 7,603,574 | B1* | 10/2009 | Gyugyi et al. | 713/300 |
| 8,634,431 | B1* | 1/2014 | Chiang et al. | 370/412 |
| 2005/0019033 | A1* | 1/2005 | Oh et al. | 398/58 |
| 2006/0176806 | A1* | 8/2006 | Yoshihara et al. | 370/229 |
| 2009/0162063 | A1* | 6/2009 | Mizutani | H04J 3/1694 398/58 |
| 2010/0111523 | A1* | 5/2010 | Hirth et al. | 398/25 |
| 2010/0290783 | A1* | 11/2010 | Kazawa | H04Q 11/0067 398/66 |
| 2010/0316380 | A1* | 12/2010 | de Lind van Wijngaarden | 398/58 |
| 2012/0008937 | A1 | 1/2012 | Cheng et al. | |
| 2012/0063774 | A1* | 3/2012 | Niibe | H04J 3/1694 398/34 |
| 2012/0114331 | A1* | 5/2012 | Kamijo et al. | 398/35 |
| 2012/0128357 | A1* | 5/2012 | Mukai et al. | 398/58 |
| 2012/0148246 | A1* | 6/2012 | Mukai et al. | 398/58 |
| 2012/0148247 | A1* | 6/2012 | Skubic et al. | 398/58 |
| 2012/0155873 | A1 | 6/2012 | Lee et al. | |
| 2012/0177361 | A1* | 7/2012 | Hirano et al. | 398/1 |
| 2012/0321315 | A1* | 12/2012 | Timm et al. | 398/67 |
| 2013/0045005 | A1* | 2/2013 | Nakura et al. | 398/25 |

OTHER PUBLICATIONS

Chow, Hungkei, et al., "BIPON: A More Energy-efficient TDM PON", *Techzine; Alcatel-lucent*; www2.alcatel-lucent.com/blogs/techzine/2012/bipon-a-more-energy-efficient-tdm-pon; Mar. 27, 2012; 6 pages.

Sankaran, Ganesh C., et al., "Reporting in ONUs with Reduced Buffers", Apr. 17, 2012, 6 pages, Optical Network Design and Modeling (ONDM), 2012 16th International Conference, *IEEE*.

* cited by examiner

*Primary Examiner* — Noel Beharry
*Assistant Examiner* — Wilfred Thomas
(74) *Attorney, Agent, or Firm* — Nicholson, De Vos, Webster & Elliot, LLP

(57) ABSTRACT

A method executed by an optical line terminal (OLT) in a passive optical network (PON). The PON includes a plurality of optical network units (ONUs) coupled with the OLT through an optical fiber, the ONUs sharing a bandwidth of the optical fiber. The method includes receiving, from the ONU, an energy conservation message indicating support for the reduced buffer memory size. The reduced buffer memory size is calculated based on the maximum committed transmission rate and the burst size limit for the downstream traffic intended for the ONU. A notification is transmitted to the ONU indicating that a portion of the buffer memory can be powered down such that only the reduced size of the buffer memory remains in operation, and downstream traffic intended for the ONU is transmitted at an average transmission rate and burst size not exceeding the maximum committed transmission rate and the burst size limit.

20 Claims, 3 Drawing Sheets

ENERGY CONSERVATION BY MEANS OF TRAFFIC SHAPING

FIELD OF THE INVENTION

The embodiments of the invention relate to the field of passive optical networks. Specifically, the embodiments relate to conserving energy in a passive optical network.

BACKGROUND

A passive optical network (PON) uses a point-to-multipoint architecture to couple an optical line terminal (OLT) with multiple optical network units (ONUs). To implement the point-to-multipoint architecture, a single optical fiber that is connected with the OLT on one end is split into multiple connections on the other end for the ONUs. The bandwidth of the fiber is shared between all of the ONUs that are connected to the fiber. When the OLT transmits data downstream through the fiber, the data is received by every ONU that is connected to the fiber. If a particular ONU receives data that is not intended for that ONU, the data is discarded.

The amount of energy that is consumed by an ONU is directly related to the speed at which data can be processed by the ONU. Because the time-based statistics of downstream traffic destined to a particular ONU cannot be assured, present ONUs must contain large buffer memories, capable of absorbing large downstream transmissions at the full PON line rate until such time as the data can be played out on subscriber interfaces, which typically operate at much lower speeds. These large buffer memories consume an appreciable amount of power.

One proposed technology for conserving energy in an ONU is commonly referred to as bit interleaving passive optical network (BIPON). In a BIPON, an ONU samples only certain bits of the downstream data that is received by the ONU. The bits that are sampled correspond to data that is intended for the ONU, while the rest of the downstream data that is not intended for the ONU can be discarded without sampling, thereby conserving energy by reducing the required size or speed of the buffer memory further downstream in the flow.

SUMMARY

In one embodiment, a method is executed by an optical line terminal (OLT) in a passive optical network (PON). The PON includes a plurality of optical network units (ONUs) coupled with the OLT through an optical fiber and the plurality of ONUs shares a bandwidth of the optical fiber. The method to conserve energy for an ONU in the plurality of ONUs comprises calculating a reduced size of a buffer memory in the ONU to match a maximum committed transmission rate and a burst size limit for a downstream traffic intended for the ONU. The method includes receiving, from the ONU, an energy conservation message indicating support for the reduced buffer memory size. The reduced buffer memory size is calculated based on the maximum committed transmission rate and the burst size limit for the downstream traffic intended for the ONU. A notification is transmitted to the ONU indicating that a portion of the buffer memory can be powered down such that only the reduced size of the buffer memory remains in operation, thereby conserving energy. The OLT then transmits downstream traffic intended for the ONU at an average transmission rate and burst size not exceeding the maximum committed transmission rate and the burst size limit.

In an embodiment, an optical line terminal (OLT) in a passive optical network (PON) conserves energy for an optical network unit (ONU) in a plurality of ONUs by calculating a reduced size of a buffer memory in the ONU to match a maximum committed transmission rate and a burst size limit for a downstream traffic intended for the ONU. The plurality of ONUs is coupled with the OLT through an optical fiber and the plurality of ONUs shares a bandwidth of the optical fiber. The OLT comprises a transceiver port, a computer processor coupled to the transceiver port, and a storage device coupled to the computer processor.

The transceiver port is configured to transmit the downstream traffic intended for the ONU, and to receive an upstream traffic from the ONU. The computer processor is configured to receive, from the ONU, an energy conservation message indicating support for the reduced buffer memory size, to calculate the reduced buffer memory size based on the maximum committed transmission rate and the burst size limit for the downstream traffic intended for the ONU, to transmit a notification to the ONU indicating that a portion of the buffer memory can be powered down such that only the reduced size of the buffer memory remains in operation, and to limit an average transmission rate and burst size of the downstream traffic intended for the ONU to not exceed the maximum committed transmission rate and the burst size limit. The storage device is configured to store the maximum committed transmission rate and the burst size limit.

In an example embodiment, a method is executed by an optical network unit (ONU) in a passive optical network (PON). The ONU is included in a plurality of ONUs coupled with an optical line terminal (OLT) through an optical fiber and the plurality of ONUs shares a bandwidth of the optical fiber. The method conserves energy in the ONU by powering down a portion of a buffer memory to match a maximum committed transmission rate and a burst size limit for a downstream traffic intended for the ONU. The method includes receiving, from the OLT, a notification indicating that the portion of the buffer memory can be powered down to a reduced buffer memory size. The portion of the buffer memory is powered down such that only the reduced size of the buffer memory remains in operation.

In an example embodiment, an optical network unit (ONU) in a passive optical network (PON) conserves energy by powering down a portion of a buffer memory to match a maximum committed transmission rate and a burst size limit for a downstream traffic intended for the ONU. The ONU is included in a plurality of ONUs coupled with an optical line terminal (OLT) through an optical fiber and the plurality of ONUs shares a bandwidth of the optical fiber. The ONU comprises a transceiver port, a buffer memory coupled to the transceiver port, and a computer processor coupled to the transceiver port and the buffer memory.

The transceiver port is configured to receive, from the OLT, the downstream traffic intended for the ONU, and to transmit an upstream traffic to the OLT. The buffer memory is configured to store the downstream traffic intended for the ONU. The computer processor is configured to receive, from the OLT, a notification indicating that the portion of the buffer memory can be powered down to a reduced buffer memory size, and to power down the portion of the buffer memory such that only the reduced size of the buffer memory remains in operation.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
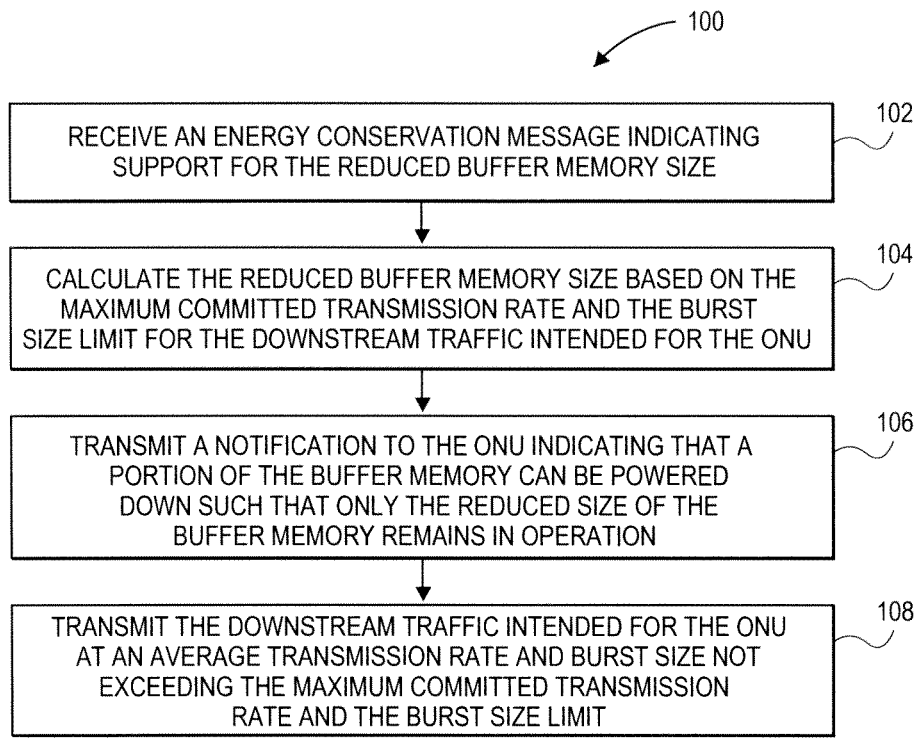
FIG. 1 is a flowchart of one embodiment of a process performed by an optical line terminal for shaping traffic in a passive optical network to conserve energy in an optical network unit.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). A 'set,' as used herein, refers to any positive whole number of items. The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

The embodiments of the invention described herein below provide a method and system for implementing traffic shaping in a passive optical network (PON) to conserve energy in an optical network unit (ONU). An optical line terminal (OLT) in the PON controls the transmission rate of data that is intended for the ONU through traffic shaping. This enables the ONU to operate its downstream receiving circuitry at the full downstream transmission rate only to the point at which it can reject data that is not intended for the ONU.

To implement the point-to-multipoint architecture for a PON, a single optical fiber from an OLT is split and shared between multiple ONUs. When the OLT transmits data downstream to the ONUs, the data is broadcasted by the OLT, and received by every ONU that is connected to the shared fiber. Each ONU checks the data and discards the data if it is not intended for that ONU. The discarded data typically represents a vast majority of the total traffic on the downstream channel for any particular ONU.

However, there is always the possibility that the OLT will transmit a large amount of data intended for a particular ONU in a single burst or in several closely timed bursts. To ensure that data is not lost during these large burst transmissions, the ONU is implicitly required to be capable of processing the received data at the full downstream transmission rate. Because the ONU must contain enough fully-powered up buffer memory to store such large transient bursts of data, this can result in wasted energy.

By way of example and not limitation, the total downstream flow rate of a PON may be about 10 Gb/s, while an Ethernet connection to the subscriber's equipment may operate at a rate of about 100 Mb/s. Further, the subscriber's service contract may specify service of only 20 Mb/s, a factor of 500× slower than the PON rate. Based on traffic statistics, a conventional OLT may transmit a large block of traffic destined for this particular ONU, thereby necessitating a large buffer memory in the ONU, which must be capable of accumulating downstream traffic at 10 Gb/s, even though the traffic will be played out at only 100 Mb/s. It may be that the maximum size of an individual packet on the PON is about 1500 bytes. If it were possible, according to an embodiment of the present invention, to assure that only one packet was transmitted at a time, followed by a delay sufficient to permit that one packet to be played out to the subscriber equipment, the ONU would require high-speed buffer memory of only about 1500 bytes. Additional high-speed buffer memory that would be needed for the ONU to operate in a conventional PON could be powered down, thereby conserving energy. It is recognized that the granularity of the ONU's memory might not be precisely equal to the theoretical minimum value; in the present example, an actual memory buffer size of 2048 bytes might be selected.

One technology for conserving energy in an ONU is known as bit interleaved passive optical network (BIPON). A BIPON compatible ONU samples bits of the downstream traffic at regular intervals. The bits that are sampled correspond to data that is intended for the ONU, while the rest of the bits are discarded without sampling. Energy is conserved in a BIPON because the ONU can perform less processing on the discarded traffic than an ONU in a typical PON.

The disadvantages of the prior art include that BIPON is not standardized and BIPON compatible equipment is not interoperable with standards-compliant equipment. Thus, in a BIPON, the OLT and every ONU must be BIPON compatible. In addition, dynamic adjustment of the sampling phase and interval in a BIPON ONU requires circuitry whose speed and complexity is not trivial. Furthermore, BIPON cannot be easily adapted to work with multicast traffic, which is downstream data that is intended for multiple ONUs. Modifying BIPON technology to work with multicast traffic can be inefficient or difficult if energy efficiency is to be retained.

The embodiments of the present invention overcome the disadvantages of the prior art by shaping traffic on the OLT side. The OLT ensures that the data intended for a particular ONU conforms to a specific traffic contract. The traffic contract defines a maximum committed transmission rate (e.g., in bytes per second) and a burst size limit (e.g., in bytes). The OLT ensures that the average transmission rate and burst size of the downstream traffic intended for the ONU do not exceed the maximum committed transmission rate and burst size limit. In turn, this enables the ONU to power down a portion of its downstream buffer memory and associated circuitry. The advantages of the embodiments described herein below include full interoperability with existing industry standards. Furthermore, the embodiments can be implemented in conjunction with existing standards-compliant energy saving features without modifying the existing standards. Additionally, energy conservation and performance can be traded off on-demand through static or dynamic bandwidth control.

FIG. 1 is a flowchart of one embodiment of a process performed by an OLT 100 for shaping traffic in a PON to conserve energy in an ONU. The process is typically implemented by a computer processor in the OLT. The OLT includes at least one computer processor and at least one storage device. The computer processor can be any type of processing device including a general or central processing unit, an application specific integrated circuit (ASIC) or similar processing device. The computer processor can be connected with the storage device by a set of buses routed over a set of mainboards or similar substrates coupled to each other.

In this embodiment, the process starts when an energy conservation message is received from an ONU indicating support for a reduced buffer memory size (Block 102). The energy conservation message can be received as a response to a request that the OLT transmitted to the ONU, or the energy conservation message can be initiated by the ONU. Other than indicating support for a reduced buffer memory size, additional information can also be included in the energy conservation message. For example, the energy conservation message can include a list of capabilities, such as reduced buffer memory size options, transmission rate options, or power down options. The message can be transmitted using any type or combination of communication protocols including machine-to-machine communication protocols. In one embodiment, the energy conservation message takes the form of an operations and maintenance (OAM) message or some other configuration message. Alternatively, the energy conservation message can be transmitted in the header portion of a packet. For example, recognition of the ONU's capabilities could be performed as part of the normal initialization process of the ONU as it is activated onto the PON.

After the energy conservation message is received, the OLT calculates the reduced buffer memory size based on the maximum committed transmission rate and the burst size limit (Block 104). In one embodiment, the maximum committed transmission rate can be a transmission rate limit from a service level agreement (SLA) of a subscriber corresponding to the ONU. In this embodiment, the OLT typically has access to the SLA to determine the maximum committed transmission rate.

In other embodiments, the maximum committed transmission rate can be a limitation of the subscriber premises network equipment that is connected to the ONU. For example, the PON can support a downstream transmission rate of 10 gigabits per second (Gb/s) to the ONU, but the subscriber can have a gigabit router connected to the ONU, which is only capable of handling traffic at 1 Gb/s. In these embodiments, the maximum committed transmission rate can be included in the energy conservation message or some other message that is received from the ONU. The ONU's capabilities may also be conveyed in the message through indirect means, for example, by way of an ONU model number that can be looked up by the OLT in a data dictionary.

The burst size limit can be determined based on the maximum transmission unit (MTU) of the PON. The MTU is the maximum size for a packet or frame of data that can be transmitted on the optical fiber, including packet overhead. Alternatively, the burst size limit can be determined without accounting for packet overhead. In a preferred embodiment, the burst size limit is equal to or exceeds the MTU of the PON.

In one embodiment, the OLT also takes into account the capabilities of the ONU when calculating the reduced buffer memory size. For example, an ONU can have multiple levels of memory buffer size in discrete increments. Thus, if the calculations based on the maximum committed transmission rate and burst size limit produce a result of 2.5 kilobytes (kB) for the reduced buffer memory size, but the ONU can only support buffer memory size options in increments of 1 kB, then the reduced buffer memory size can be set to 3 kB. In this example, a memory size option that is greater than the calculated memory size is used to ensure that transmitted data intended for the ONU does not get lost.

At Block 106, the OLT transmits a notification to the ONU indicating that a portion of the buffer memory can be powered down such that only the reduced size of the buffer memory remains in operation. The notification can include the reduced buffer memory size or some other indication of a buffer memory size option that is supported by the ONU.

At Block 108, the OLT transmits the downstream traffic intended for the ONU at an average transmission rate and burst size not exceeding the maximum committed transmission rate and the burst size limit. Any traffic shaping technique can be used to limit the average transmission rate and burst size of the downstream traffic. In a preferred embodiment, a token bucket is used by the OLT to shape the downstream traffic. The OLT maintains a separate token bucket for each ONU that the OLT performs traffic shaping for. Tokens are added to a token bucket at a uniform rate based on the maximum committed transmission rate. The size of the token bucket is set based on the burst size limit. When the bucket is full, additional tokens are discarded.

When data that is intended for the ONU corresponding to the token bucket presents itself for transmission, the OLT checks the token bucket to ensure that enough tokens have accumulated before transmitting the data. Tokens are removed from the bucket when the data is transmitted. The number of tokens that is removed corresponds to the size of the data. For example, the OLT can remove one token from the bucket for each byte of data that is transmitted. In one embodiment, overhead data is not subject to token charges. If there are insufficient tokens in the token bucket to transmit a particular packet of data, the OLT buffers the data until enough tokens have accumulated in the token bucket, thereby effectively shaping the flow to a value not exceeding the rate of token accumulation. If the buffer in the OLT is not large enough to store additional data that is presented for transmission, the excess data is discarded.

As a result of the traffic shaping, the OLT can ensure that the long-term average transmission rate of data intended for a particular ONU will not exceed the maximum committed transmission rate. Although bursts of traffic intended for the ONU may be transmitted at the full downstream transmission rate, no burst will exceed the burst size limit. Furthermore, since the OLT can shape traffic for each ONU individually, the OLT can be operated with energy-saving compatible ONUs and standard but non-compatible ONUs simultaneously.

Figure 2:
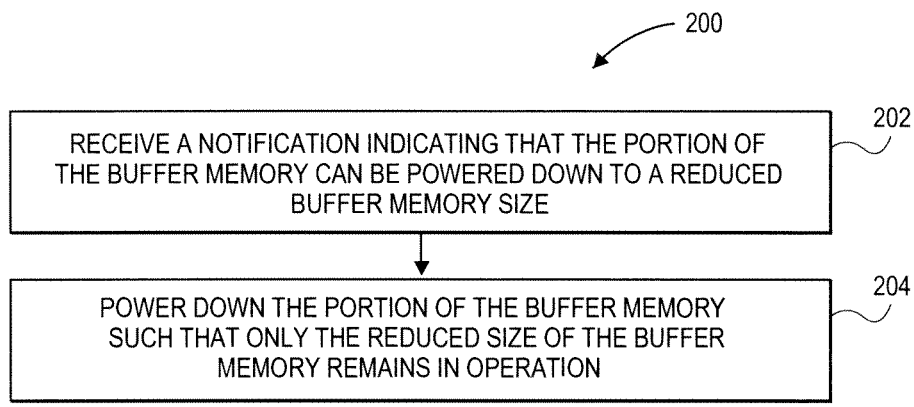
FIG. 2 is a flowchart of an example embodiment of a process performed by an optical network unit to conserve energy.

FIG. 2 is a flowchart of an example embodiment of a process performed by an ONU 200 to conserve energy. The process is typically implemented by a computer processor in the ONU. The ONU includes at least one computer processor and at least one buffer memory. The computer processor can be any type of processing device including a general or central processing unit, an application specific integrated circuit (ASIC) or similar processing device. The computer processor can be connected with the buffer memory by a set of buses routed over a set of mainboards or similar substrates coupled to each other.

The buffer memory can be implemented using any storage device capable of storing data for any amount of time, including volatile and non-volatile storage devices. While an ONU can have only one buffer memory, a typical ONU has multiple buffer memories, including a line rate buffer and a user rate buffer. The line rate buffer stores downstream data received from the OLT until the data can be processed. The user rate buffer stores the data after it has been processed, until the data can be transmitted out of the ONU to the user premises equipment.

In this embodiment, the process starts by receiving a notification from an OLT indicating that a portion of the buffer memory can be powered down to a reduced buffer memory size (Block 202). Additional information can also be included in the notification. For example, in one embodiment, the OLT can perform the calculations to determine how much buffer memory is necessary to support an average transmission rate and burst size limit, and the calculated buffer memory size can be included in the notification. In a different embodiment, the OLT can transmit the maximum committed transmission rate and burst size limit, and the ONU can perform the calculations to determine a reduced buffer memory size.

After receiving the notification, the ONU powers down the portion of the buffer memory such that only the reduced size of the buffer memory remains in operation (Block 204). The portion of buffer memory that is powered down can be a portion of the line rate buffer, a portion of the user rate buffer, or a portion of both buffer memories.

Since the notification indicates to the ONU that downstream traffic intended for the ONU will not exceed a certain transmission rate, the ONU can operate its downstream receiving circuitry according to the full downstream transmission rate only to the point at which it can reject traffic not destined for the ONU. The remaining downstream processing circuitry, including the buffer memory, can be operated in accordance with the maximum committed transmission rate and burst size limit, thereby conserving power.

In one embodiment where backward compatibility is not required, the extra processing circuitry and buffer memory storage can be omitted altogether from the hardware design of the ONU. When an ONU is manufactured with reduced buffer memory size, it may or may not be desirable to also provide for powering down portions of the reduced buffer memory.

Figure 3:
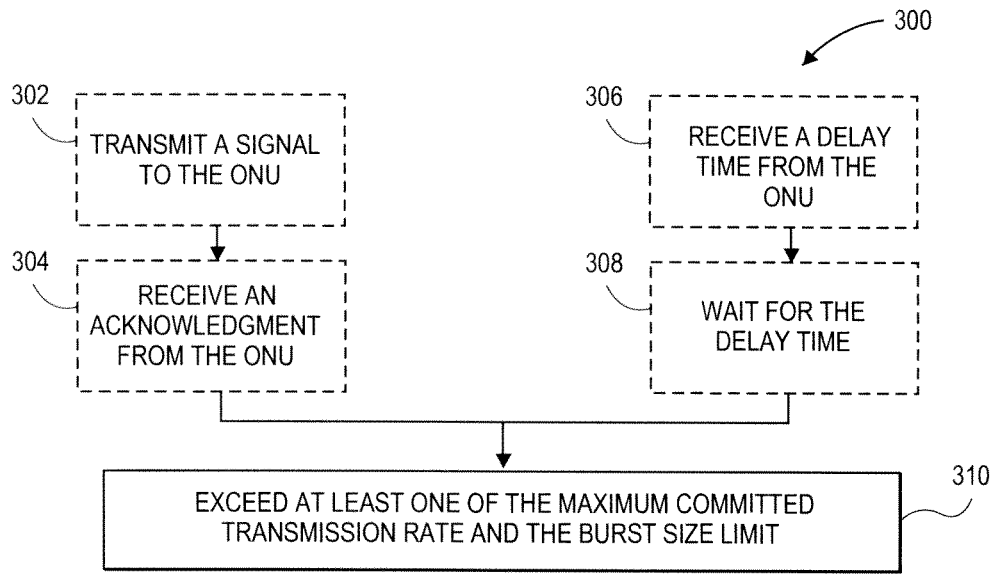
FIG. 3 is a flowchart of an example embodiment of a process performed by an optical line terminal for restoring power to an optical network unit to handle increased traffic.

FIG. 3 is a flowchart of an example embodiment of a process performed by an OLT 300 for restoring power to some part of an ONU's buffer memory to handle increased traffic. The power restoration process can be performed for any number of reasons. For example, the traffic transmission rate can be increased due to changes in the SLA or to honor the increased bandwidth requirement of an on-demand request from a subscriber.

In one embodiment, the process starts at Block 302 where the OLT transmits a signal to the ONU. The signal indicates to the ONU that the current maximum committed transmission rate and/or the burst size limit will be exceeded. The signal can be transmitted using any type or combination of communication protocols including machine-to-machine communication protocols. In one embodiment, the signal can be transmitted in a configuration message. Alternatively, the signal can be transmitted in the header portion of a packet.

At Block 304, an acknowledgement is received from the ONU. The acknowledgement indicates to the OLT that the ONU has completed the powering up of a portion of its buffer memory and is ready to accept traffic intended for the ONU at a faster rate. The acknowledgement can be transmitted using any type or combination of communication protocols including machine-to-machine communication protocols. In one embodiment, the acknowledgement can be transmitted in a configuration message. Alternatively, the acknowledgement can be transmitted in the header portion of a packet.

At Block 310, the OLT exceeds the previous maximum committed transmission rate and/or the burst size limit for transmitting traffic that is intended for the ONU. The new transmission rate can be the full downstream transmission rate, or it can be bounded by a higher maximum committed transmission rate and/or burst size limit.

In another embodiment, the process starts with the OLT receiving a delay time from the ONU (Block 306). The delay time can be received in response to a signal that the OLT transmitted to the ONU, or the transmission of the delay time can be initiated by the ONU. The delay time indicates the amount of time it takes for the ONU to power up additional buffer memory and related circuitry such that increased traffic transmissions can be accepted without data loss. At Block 308, the OLT waits for the delay time to pass before exceeding the previous maximum committed transmission rate and/or the burst size limit at Block 310.

Similar processes to the embodiments described above can also be used to adjust the transmission rate lower and thereby achieve higher energy efficiency for the ONU. These downward adjustments can be performed for analogous reasons as those for increasing transmission rate and/or burst size. It is understood that there is no need for the OLT 300 to wait for an elapsed delay before reducing its average transmission rate and/or burst size.

Figure 4:
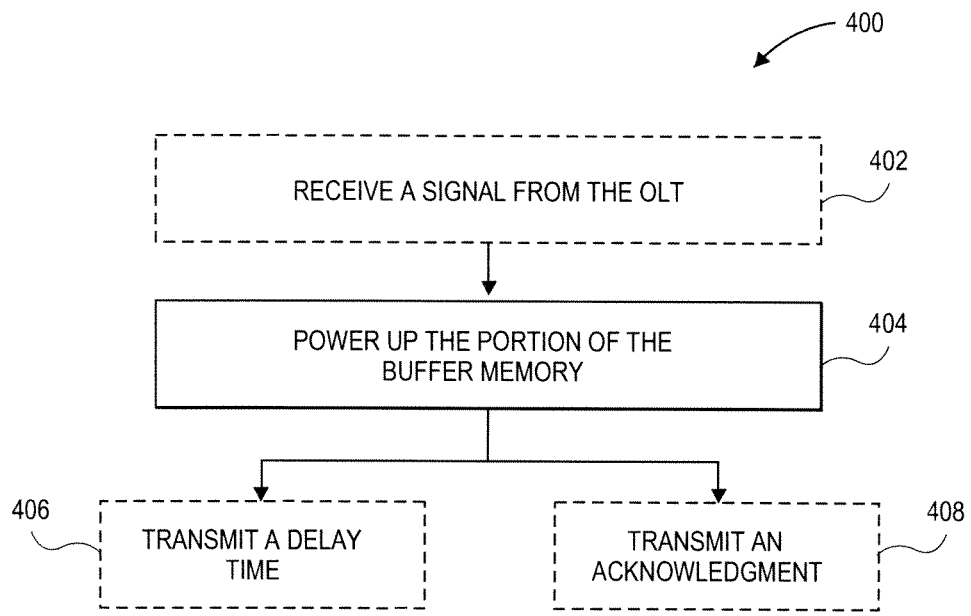
FIG. 4 is a flowchart of one embodiment of a process performed by an optical network unit for restoring power to handle increased traffic.

FIG. 4 is a flowchart of one embodiment of a process performed by an ONU 400 for restoring power to handle increased traffic. In this embodiment, the process starts with the ONU receiving a signal from the OLT indicating that the transmission rate will increase (Block 402). The signal provides a warning to the ONU so that power can be restored before the transmission rate is actually increased. The signal can be transmitted using any type or combination of communication protocols including machine-to-machine communication protocols. In one embodiment, the signal can be transmitted in a configuration message. Alternatively, the signal can be transmitted in the header portion of a packet.

In other embodiments, the ONU can initiate the increase in transmission rate. For example, if the transmission rate is being increased to honor an on-demand request from a subscriber, the ONU can initiate the increase in transmission rate rather than the OLT by snooping the request from the subscriber before forwarding the request to the OLT.

In a further embodiment, if the ONU can restore power to its buffer memory and associated circuitry in a sufficiently brief interval, no signal exchange is necessary and the power can be restored unilaterally by the ONU upon the arrival of downstream traffic at an increased rate of transmission.

At Block 404, the ONU powers up a portion of the buffer memory. Depending on the amount of increase to the downstream transmission rate and the capabilities of the ONU, the entire portion of the buffer memory that was powered down to conserve energy can be powered back up or only a fraction of the portion can be powered back up.

In one embodiment, when the ONU begins to power up the portion of the buffer memory, the ONU transmits a delay time to the OLT based on the amount of time it takes to power up the buffer memory (Block 406). The delay time informs the OLT the amount of time to delay before increasing the transmission rate and/or burst size. In another embodiment, the ONU transmits an acknowledgement to the OLT after the portion of buffer memory is fully powered up and operational (Block 408). The acknowledgement tells the OLT that the ONU is ready to accept traffic at an increased rate of transmission.

Figure 5:
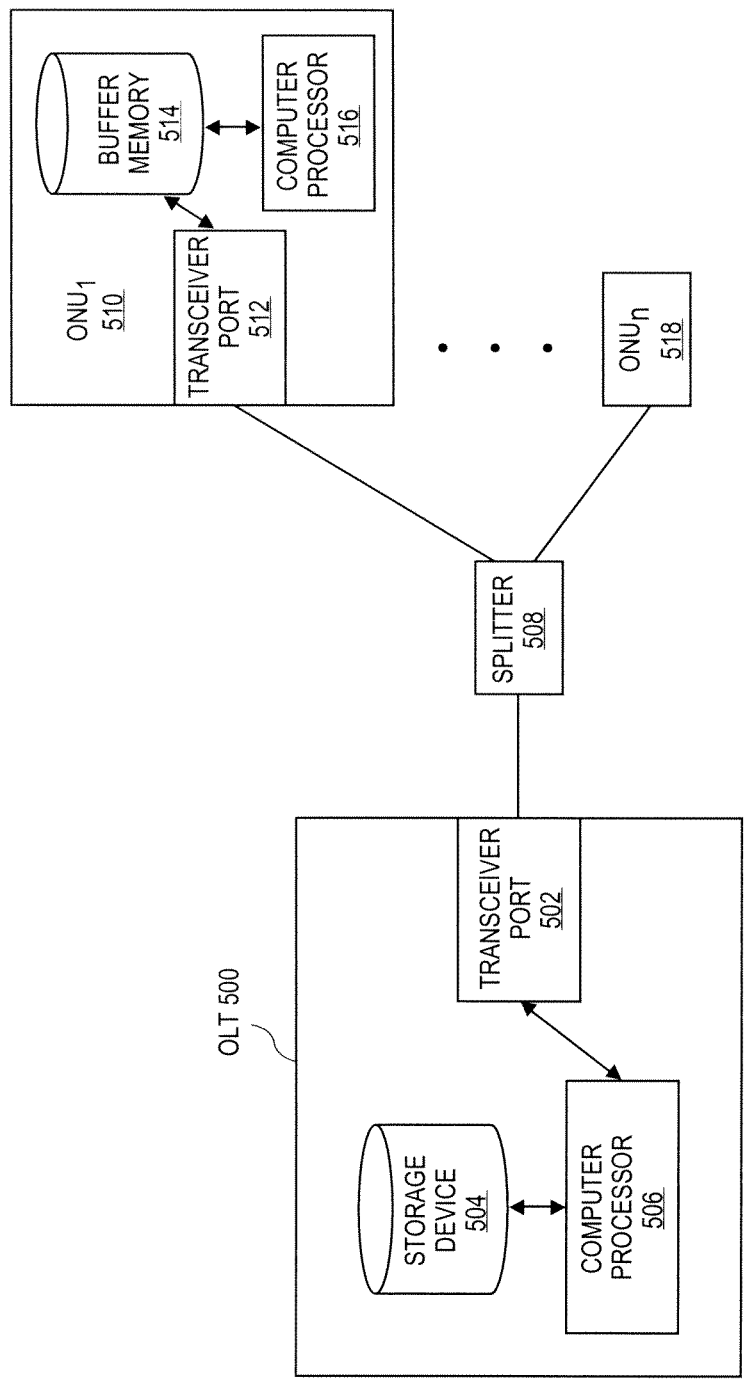
FIG. 5 is a diagram of one embodiment of a passive optical network that includes an optical line terminal implementing traffic shaping and a plurality of optical network units for conserving energy.

FIG. 5 is a diagram of one embodiment of a PON that includes an OLT 500 implementing traffic shaping and a plurality of ONUs 510 and 518 for conserving energy. In this embodiment, the PON is a time division multiplexed PON (TDM-PON). Since ONUs 510 and 518 share a single fiber cable for upstream data transmissions to OLT 500, each ONU is assigned a time slot for transmission to avoid collision. Downstream traffic is broadcast by the OLT and filtered by the ONUs. In other embodiments, the PON can be a combined time and wavelength division multiplexed PON (WDM-PON), where upstream data transmissions are separated by either or both of time and wavelength for each ONU, and downstream traffic is transmitted on a plurality of wavelengths. The PON also includes an optical splitter 508 for splitting the fiber connection from OLT 500 to the plurality of ONUs 510 and 518.

OLT 500 includes a transceiver port 502, a storage device 504, and a computer processor 506. Transceiver port 502 is an optical transceiver that is coupled with the fiber connection. Transceiver port 502 transmits downstream data to ONUs 510 and 518 and receives upstream data from ONUs 510 and 518. Storage device 504 can be volatile or non-volatile storage. Computer processor 506 can be any type of processing device including a general or central processing unit, an application specific integrated circuit (ASIC) or similar processing device. Computer processor 506 is coupled with transceiver port 502 and storage device 504 by a set of buses routed over a set of mainboards or similar substrates coupled to each other.

$ONU_1$ 510 includes a transceiver port 512, a buffer memory 514, and a computer processor 516. Although not depicted in this figure, $ONU_n$ also includes the same components. Transceiver port 512 is an optical transceiver that is coupled with the fiber connection. Transceiver port 512 receives downstream data from OLT 500 and transmits upstream data to OLT 500. Buffer memory 514 can be implemented using at least one volatile or non-volatile storage device, and part or all of buffer memory 514 may be integrated as part of an ONU ASIC system on a chip (SOC) device. In a preferred embodiment, buffer memory 514 comprises a plurality of memory subunits that may be independently powered down to conserve energy. Computer processor 516 can be any type of processing device including a general or central processing unit, an application specific integrated circuit (ASIC) or similar processing device. Computer processor 516 is coupled with transceiver port 512 and buffer memory 514 by a set of buses routed over a set of mainboards or similar substrates, within a single SOC, or similarly coupled to each other.

OLT 500 performs traffic shaping for compatible ONUs according to any of the embodiments described herein-above. $ONU_1$ 510 is a compatible ONU that conserves energy by powering down a portion of buffer memory 514 and associated circuitry in accordance with any of the embodiments described herein-above. $ONU_n$ 518 can be either a compatible ONU or a non-compatible ONU. Since OLT 500 performs traffic shaping for each ONU individually, compatible and non-compatible ONUs can be operated in the same PON simultaneously. Alternatively, ONUn 518 can be an ONU manufactured with a buffer size sized to operate only with a traffic shaping OLT 500, in which case, the OLT 500 performs traffic shaping for ONUn 518, but may or may not engage in memory buffer power down transactions with ONUn 518.

While the embodiments described herein-above are specific to a PON, the same embodiments are also applicable to point-to-point networks, including WDM PONs, if there is a difference between the maximum transmission rate of the connection and the maximum committed transmission rate. For example, a business user can have a 10 Gb/s fiber connection, but the maximum committed transmission rate can be limited to 1 Gb/s due to commercial considerations. The embodiments described herein-above can be applied in such exemplary situations to conserve energy.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method executed by an optical line terminal (OLT) in a passive optical network (PON), where the PON includes a plurality of optical network units (ONUs) coupled with the OLT through an optical fiber, and where the plurality of ONUs shares a bandwidth of the optical fiber, the method to conserve energy for an ONU in the plurality of ONUs by calculating a reduced size of a buffer memory in the ONU to match a maximum committed transmission rate and a burst size limit for a downstream traffic intended for the ONU, the method comprising the steps of:
    receiving, from the ONU, an energy conservation message indicating support for powering down a portion of the buffer memory to the reduced buffer memory size;
    calculating the reduced buffer memory size based on the maximum committed transmission rate and the burst size limit for the downstream traffic intended for the ONU;
    transmitting a notification to the ONU indicating that a portion of the buffer memory can be powered down such that only the reduced size of the buffer memory remains in operation; and
    transmitting the downstream traffic intended for the ONU at an average transmission rate and burst size not exceeding the maximum committed transmission rate and the burst size limit.

2. The method of claim 1, further comprising the steps of:
    calculating a token addition rate based on the maximum committed transmission rate;
    setting the token addition rate for a token bucket;
    setting a bucket capacity for the token bucket based on a maximum transmission unit (MTU) of the PON;
    adding a token to the token bucket after an interval of time based on the token addition rate; and
    removing a number of tokens from the token bucket based on a size of a data packet when the data packet is transmitted to the ONU.

3. The method of claim 1, further comprising the step of: transmitting a signal to the ONU indicating that at least one of a previous maximum committed transmission rate and the burst size limit will be exceeded.

4. The method of claim 1, further comprising the steps of:
    receiving a delay time from the ONU; and
    waiting for an amount of time based on the delay time before exceeding at least one of a previous maximum committed transmission rate and the burst size limit.

5. The method of claim 3, further comprising the steps of:
    receiving an acknowledgement from the ONU; and
    delaying exceeding at least one of the previous maximum committed transmission rate and the burst size limit until the acknowledgement is received.

6. An optical line terminal (OLT) in a passive optical network (PON), wherein the PON includes a plurality of optical network units (ONUs) coupled with the OLT through an optical fiber, and wherein the plurality of ONUs shares a bandwidth of the optical fiber, the OLT to conserve energy for an ONU in the plurality of ONUs by calculating a reduced size of a buffer memory in the ONU to match a maximum committed transmission rate and a burst size limit for a downstream traffic intended for the ONU, the OLT comprising:
    a transceiver port configured to transmit the downstream traffic intended for the ONU, and to receive an upstream traffic from the ONU; a computer processor coupled to the transceiver port and configured to execute a set of
    instructions to receive, from the ONU, an energy conservation message indicating support for powering down a portion of the buffer memory to the reduced buffer memory size, to calculate the reduced buffer memory size based on the maximum committed transmission rate and the burst size limit for the downstream traffic intended for the ONU, to transmit a notification to the ONU indicating that a portion of the buffer memory can be powered down such that only the reduced size of the buffer memory remains in operation, and to limit an average transmission rate and burst size of the downstream traffic intended for the ONU to not exceed the maximum committed transmission rate and the burst size limit; and
    a storage device coupled to the computer processor and configured to store the set of instructions, the maximum committed transmission rate and the burst size limit.

7. The OLT of claim 6, wherein the computer processor is further configured to execute the set of instructions to calculate a token addition rate based on the maximum committed transmission rate, to set the token addition rate for a token bucket, to set a bucket capacity for the token bucket based on a maximum transmission unit (MTU) of the PON, to add a token to the token bucket after an interval of time based on the token addition rate, and remove a number of tokens from the token bucket based on a size of a data packet when the data packet is transmitted to the ONU.

8. The OLT of claim 6, wherein the computer processor is further configured to execute the set of instructions to transmit a signal to the ONU indicating that at least one of a previous maximum committed transmission rate and the burst size limit will be exceeded.

9. The OLT of claim 6, wherein the computer processor is further configured to execution of the set of instructions to receive a delay time from the ONU, and to wait for an amount of time based on the delay time before exceeding at least one of a previous maximum committed transmission rate and the burst size limit.

10. The OLT of claim 8, wherein the computer processor is further configured to execute the set of instructions to receive an acknowledgement from the ONU, and to delay exceeding at least one of the previous maximum committed transmission rate and the burst size limit until the acknowledgement is received.

11. A method executed by an optical network unit (ONU) in a passive optical network (PON), where the ONU is included in a plurality of ONUs coupled with an optical line terminal (OLT) through an optical fiber, and where the plurality of ONUs shares a bandwidth of the optical fiber, the method to conserve energy in the ONU by powering down a portion of a buffer memory to match a maximum committed transmission rate and a burst size limit for a downstream traffic intended for the ONU, the method comprising the steps of:
  transmitting, to the ONU, an energy conservation message indicating support for powering down the portion of the buffer memory to a reduced buffer memory size:
  receiving, from the OLT, a notification indicating that the portion of the buffer memory can be powered down to the reduced buffer memory size;
  wherein the reduced buffer memory size is calculated by the OLT based on the maximum committed transmission rate and the burst size limit for the downstream traffic intended for the ONU;
  receiving, the downstream traffic from the OLT at an average transmission rate and burst size not exceeding the maximum committed transmission rate and the burst size limit; and
  powering down the portion of the buffer memory such that only the reduced size of the buffer memory remains in operation.

12. The method of claim 11, further comprising the step of: calculating the reduced buffer memory size based on the maximum committed
  transmission rate and the burst size limit, wherein the notification from the OLT includes the maximum committed transmission rate and the burst size limit.

13. The method of claim 11, further comprising the steps of: receiving a signal from the OLT indicating that at least one of a previous maximum committed transmission rate and the burst size limit will be exceeded; and powering up the portion of the buffer memory in response to receiving the signal.

14. The method of claim 11, further comprising the step of:
  transmitting, to the OLT, a delay time based on an amount of time that it takes to power up the portion of the buffer memory.

15. The method of claim 11, further comprising the steps of: powering up the portion of the buffer memory; and
  transmitting an acknowledgement to the ONU after the portion of the buffer memory is fully powered up.

16. An optical network unit (ONU) in a passive optical network (PON), wherein the ONU is included in a plurality of ONUs coupled with an optical line terminal (OLT) through an optical fiber, and wherein the plurality of ONUs shares a bandwidth of the optical fiber, the ONU to conserve energy by powering down a portion of a buffer memory to match a maximum committed transmission rate and a burst size limit for a downstream traffic intended for the ONU, the ONU comprising:
  a transceiver port configured to receive, from the OLT, the downstream traffic intended for the ONU, and to transmit an upstream traffic to the OLT;
  the buffer memory coupled to the transceiver port and configured to store the downstream traffic intended for the ONU; a storage device configured to store a set of instructions; and
  a computer processor coupled to the storage device, the transceiver port and the buffer memory and configured to execute the set of instructions to transmit, to the OLT, an energy conservation message indicating support for powering down the portion of the buffer memory to a reduced buffer memory size, to receive, from the OLT, a notification indicating that the portion of the buffer memory can be powered down to the reduced buffer memory size, and to power down the portion of the buffer memory such that only the reduced size of the buffer memory remains in operation;
  wherein the reduced buffer memory size is calculated by the OLT based on the maximum committed transmission rate and the burst size limit for the downstream traffic intended for the ONU; and
  wherein the downstream traffic intended for the ONU is limited by an average transmission rate and burst size not to exceed the maximum committed transmission rate and the burst size limit.

17. The ONU of claim 16, wherein the computer processor is further configured to execute the set of instructions to calculate the reduced buffer memory size based on the maximum committed transmission rate and the burst size limit, and wherein the notification from the OLT includes the maximum committed transmission rate and the burst size limit.

18. The ONU of claim 16, wherein the computer processor is further configured to execute the set of instructions to receive a signal from the OLT indicating that at least one of a previous maximum committed transmission rate and the burst size limit will be exceeded, and to power up the portion of the buffer memory in response to receiving the signal.

19. The ONU of claim 16, wherein the computer processor is further configured to execute the set of instructions to transmit, to the OLT, a delay time based on an amount of time that it takes to power up the portion of the buffer memory.

20. The ONU of claim 16, wherein the computer processor is further configured to execute the instructions to power up the portion of the buffer memory, and to transmit anacknowledgement to the ONU after the portion of the buffer memory is fully powered up.

* * * * *